United States Patent [19]

Storimans Franciscus J. A.

[11] Patent Number: 4,732,263

[45] Date of Patent: Mar. 22, 1988

[54] BULK FEEDER FOR ELECTRONIC COMPONENTS

[75] Inventor: Storimans Franciscus J. A., Vandorf, Canada

[73] Assignee: GPD Canada Inc., Gormley, Canada

[21] Appl. No.: 890,954

[22] Filed: Jul. 31, 1986

[51] Int. Cl.⁴ ........................................... B65G 47/12
[52] U.S. Cl. ................................. 198/550.13; 193/17; 198/397; 221/174; 221/254
[58] Field of Search ........... 198/381, 397, 443, 550.13; 271/223; 221/174, 254; 193/17

[56] References Cited

U.S. PATENT DOCUMENTS

| | | | |
|---|---|---|---|
| 1,145,774 | 7/1915 | Kotkovsky | 221/254 X |
| 2,428,103 | 9/1947 | Vergobbi | 193/17 X |
| 2,581,042 | 1/1952 | Otto | 198/381 X |
| 3,305,067 | 2/1967 | Mayer | 198/443 X |
| 3,511,356 | 5/1970 | Biloca | 198/443 |
| 3,537,580 | 11/1970 | Beroset | 198/472.1 X |
| 3,742,678 | 7/1973 | Wyatt | 198/381 X |
| 3,973,457 | 8/1976 | Storimans | 83/411 R |
| 4,042,098 | 8/1977 | D'Agnolo et al. | 198/443 X |
| 4,209,959 | 7/1980 | Bachman et al. | 198/381 X |
| 4,282,908 | 8/1981 | Bankes et al. | 198/443 X |
| 4,308,942 | 1/1982 | Ackley | 198/397 X |

FOREIGN PATENT DOCUMENTS 60-87160  5/1985  Japan ..................... 271/223

Primary Examiner—Frank E. Werner
Assistant Examiner—Janice Krizek
Attorney, Agent, or Firm—Fetherstonhaugh & Co.

[57] ABSTRACT

A nonmagnetic bulk feeder for feeding electronic components one at a time into a lead forming machine or the like comprises a hopper and a chute for loading the components into the hopper. A conveyor is mounted for movement along the bottom wall of the hopper. The conveyor is formed with notches which are arranged closely adjacent one another to receive the transversely extending body portion of a component located in the lower end of the hopper to transport the components one at a time out of the hopper. The chute has a slipway channel which is shaped to axially align electronic components with the direction in which they slide down the chute. The chute is arranged to discharge the components laterally of the hopper from a point adjacent a first side wall toward the other side wall so as to strike the other side wall at a point of contact adjacent the back wall such that the component will thereafter slide down the back wall to assume a position extending transversely of the hopper at the lower end of the back wall. A conveyor is mounted for movement along the bottom wall from the lower end of the back wall to a receiver for components. The conveyor is adapted to receive the transversely extending body portion of a component located at the lower end of the back wall to transport the components one at a time out of the hopper.

8 Claims, 6 Drawing Figures

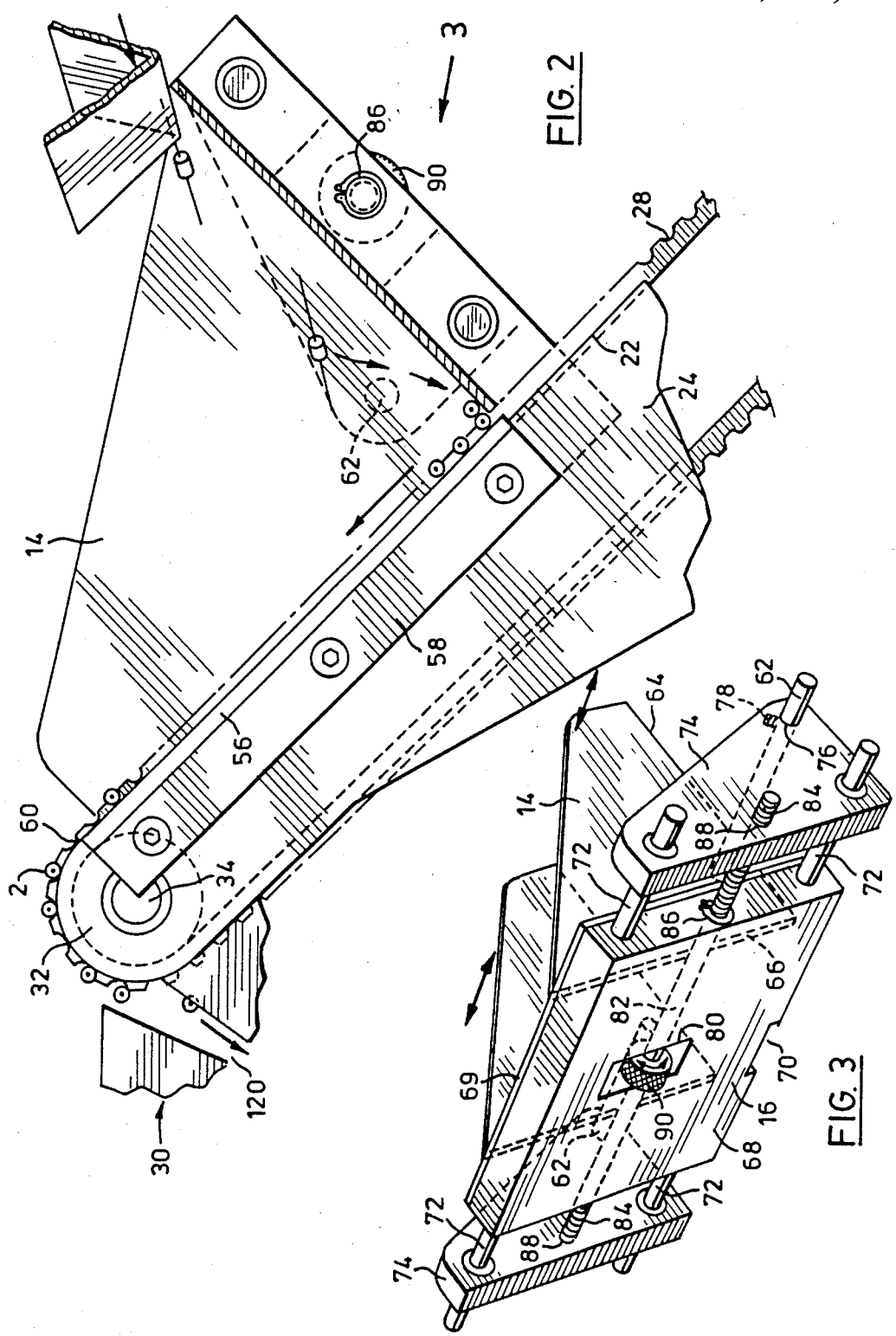

BULK FEEDER FOR ELECTRONIC COMPONENTS

This invention relates to bulk feeders for feeding electronic components one at a time into a lead forming machine or the like.

PRIOR ART

Electronic components such as resistors and transistors are small and difficult to handle and considerable difficulty has been experienced in providing a mechanism which will facilitate the loading of these components into a lead forming machine.

It is common practice to manually position the components one at a time into a dispenser which serves to dispense the components one at a time into the lead forming machine. This is a manual task which is very taxing to the operator. It is also very difficult for an operator to load the dispenser at a speed anywhere approaching the speed at which the lead forming machine is capable of operating. Consequently, despite the fact that lead forming machines are capable of operating at very high speeds, they tend to operate on a batch basis which is limited by the storage capacity of the dispenser. This greatly reduces the efficiency of operation of the lead forming machine.

In my prior U.S. Pat. No. 3,973,457 dated Nov. 18, 1975, I disclosed a simple form of hopper for feeding components to the feeder. The difficulty with this hopper is that the components tend to become jammed in the base if they are not fed one at a time into the hopper with the result that feeding is a slow operation.

In order to increase the speed at which the dispencer can be loaded, components are frequently initially positioned on a card so as to be properly aligned for insertion into the dispenser when it is to be reloaded with a further batch of components. The difficulty is, however, experienced in transferring the components from the card into the dispenser and the loading process is again costly and time-consuming.

It is an object of the present invention to overcome the difficulties of the prior art described above and to provide a simple and efficient bulk feeder.

It is a further object of the present invention to provide a bulk feeder which will receive randomly discharged components and will align the components and discharge the components one at a time into a dispenser of a lead forming machine.

SUMMARY OF INVENTION

According to one aspect of the present invention, there is provided a bulk feeder for feeding electronic components one at a time into a lead forming machine, each component having a body portion and axially aligned lead wires extending one from each end of the body portion, said feeder comprising a hopper comprising a pair of oppositely disposed side walls which are spaced from one another a distance which is slightly greater than the length of the electronic components which are to be fed to the forming machine, a back wall extending between the side walls and being downwardly and forwardly inclined, said back wall having a lower end, a bottom wall extending between the side walls, at least a portion of said bottom wall extending forwardly and upwardly from the lower end of the back wall, a chute having a slipway channel which is shaped to axially align electronic components with the direction in which they slide down the chute, said chute having a discharge end arranged to discharge the axially aligned components laterally of the hopper from a point adjacent a first of said side walls toward the other side wall so as to strike the other side wall at a point of contact adjacent the back wall such that the component will thereafter slide down the back wall to assume a position extending transversely of the hopper at the lower end of the back wall, a conveyor mounted for movement along the bottom wall from said lower end of said back wall to a receiver for said components, said conveyor being adapted to receive the transversely extending body portion of a component located at the lower end of the back wall to transport the components one at a time out of said hopper.

The invention will be more clearly understood after reference to the following detailed specification read in conjunction with the drawings wherein;

FIG. 2 is a sectional view of the feeder taken along the line 2—2 of FIG. 1.

FIG. 3 is a view of the back wall of the bulk feeder in the direction of the arrow 3 of FIG. 2.

Machines for forming the leads of electronic components are well known. One such machine is described in U.S. Pat. No. 3,973,457.

Figure 1:
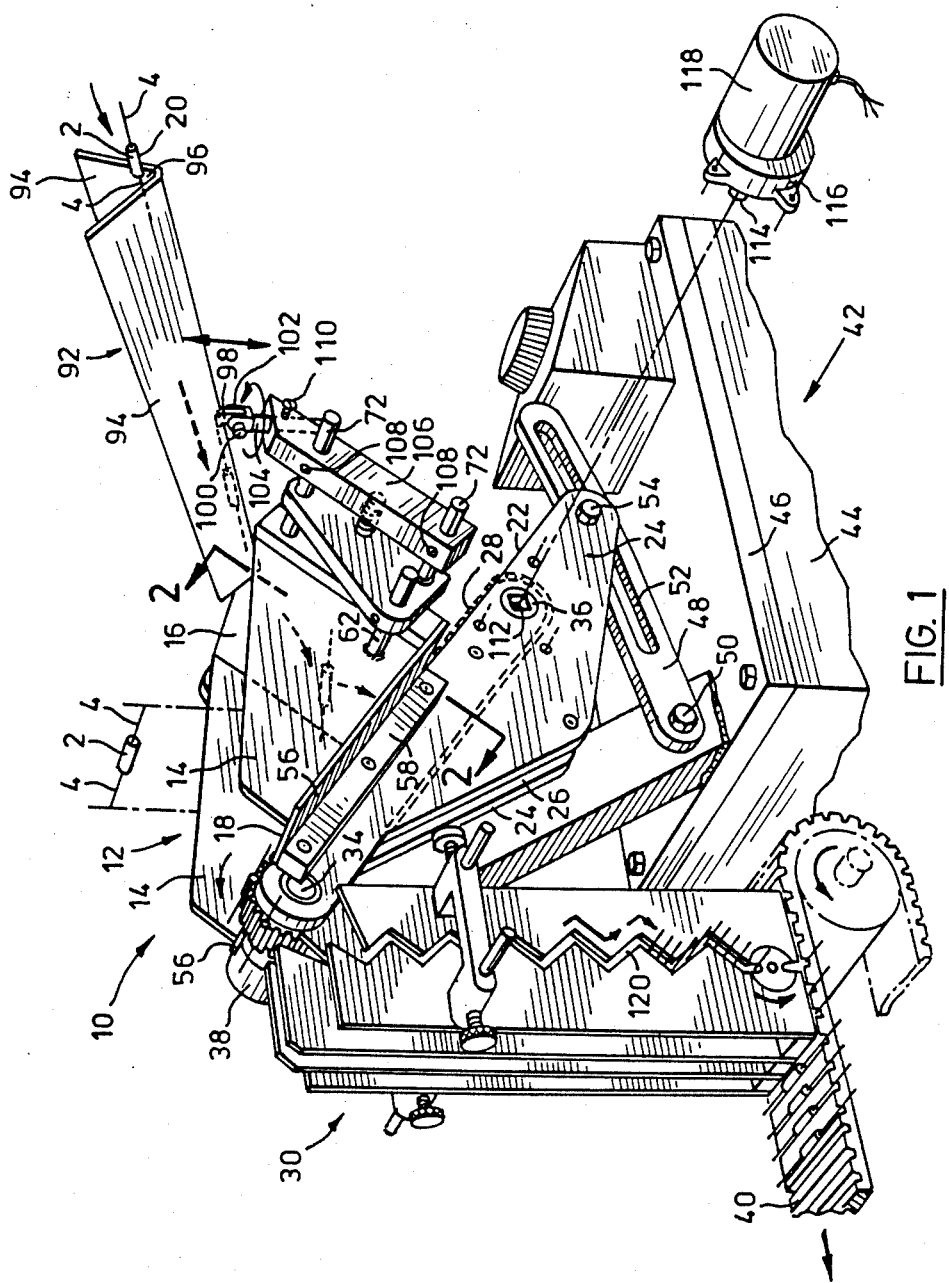
FIG. 1 is a pictorial side view of a bulk feeder constructed in accordance with an embodiment of the present invention.

With reference to FIG. 1 of the drawings, the reference numeral 10 refers generally to a bulk feeder constructed in accordance with an embodiment of the present invention. The bulk feeder serves to feed electronic components 20, one at a time into a component dispenser 30 of the type described in U.S. Pat. No. 3,973,457, which may feed components one at a time on to a transfer wheel, a conveyor 40 or the like of a lead forming machine 42. The lead forming machine 42 has a housing 44 which has a top wall 46 located adjacent the dispenser 30.

The electronic components 20 which are to be formed are generally resistors or transistors such as those identified in FIG. 1 of the drawings and each comprise a cylindrical shaped body portion 2 having a pair of leads 4 extending one from each end and axially aligned with the body portion 2.

The hopper 12 consists of a pair of oppositely disposed side walls 14, a back wall 16 and a bottom wall 18.

The bottom wall 18 is a composite wall formed by the upper edges 22 of two support plates 24 which are mounted in a spaced parallel relationship with a gap 26 formed therebetween. A conveyor belt 28 is mounted on rollers 32 and forms a raised ridge which extends longitudinally of the bottom wall 18. The rollers 32 are mounted on shafts 34 and 36 located at opposite ends of the conveyor. The shaft 34 is a stationary shaft which is mounted at the upper end of the support arm 38, the other end of which is welded to the top wall 46 of the housing 44. An angular adjustment arm 48 has one end secured by means of a set screw 50 to the lower end of the support arm 38. A slot 52 is formed in the arm 48. The arm 48 extends into the gap 26 formed between the support plates 24 and a bolt 54 extends through the arms 26 and the slot 52 and has a nut (not shown) mounted on its inner end. In order to adjust the angle of inclination of the bottom wall 18, it is merely necessary to release the nut which is mounted on the bolt 54 and rotate the support arms about the axis of the shaft 34 to the required inclination with respect to the horizontal plane.

The bottom wall 18 of the conveyor also comprises a pair of platforms 56 which are secured to support rails 58 which are mounted on the support arms 24.

The conveyor belt 28 is formed with a plurality of transversely extending notches 60, each of which is proportioned to receive the body portion 2 of a component in a free seating relationship.

The side walls 14 each have a stub shaft 62 projecting laterally outwardly therefrom. The side walls 14 have a bottom edge 64 which is arranged in a face-to-face relationship with the platforms 56 and are spaced a sufficient distance therefrom to permit free lateral movement of the side walls 14 with respect to the platforms 56. The side walls 14 also have a back edge 66 disposed opposite and facing the back wall 16.

The back wall 16 comprises a back plate 68 which has a belt clearance notch 70 extending across its lower edge to provide clearance for the passage of the raised ridge portion of the conveyor belt. A pair of stub shafts 72 project laterally from each side edge of the back plate 68. An end plate 74 is mounted on each pair of stub shafts 72 for movement toward and away from the side edges of the back plate 68. The back plate 68 has an inner face which is lined with a low friction liner panel 69. The stub shaft 62 of the side wall 14 is mounted in the passage 76 formed in the adjacent end panel 74 and is secured therein by means of a grub screw 78 so that the side walls 14 are held fast with respect to their adjacent end plate 74.

A slot 80 is formed in the back plate 68 centrally of the width thereof. An adjustment shaft 82 is mounted in the back plate 68 and has threaded portions 84 projecting laterally from opposite side edges of the back plate 68. Spring clips 86 serve to retain the shaft 82 against axial movement while permitting free rotational movement with respect to the back plate 68. The threaded portions 84 of the shaft 82 are threadedly mounted in threaded passages 88 which are formed in the end plates 74. A thumbwheel 90 is mounted on the shaft 82 in the slot 80 such that by rotating the thumbwheel 90, the shaft 82 is rotatably driven. Rotation of the shaft 82 causes movement of the end plates 74 toward or away from one another and this movement in turn causes movement of the side plates 14 toward or away from one another.

A chute 92 is provided for the purposes of guiding the components 20 into the hopper 12. The chute 92 comprises a pair of side walls 94 which converge downwardly to form a V-shaped slipway 96. The chute 92 has a flange 98 projecting downwardly therefrom which is pivotally mounted on a pivot pin 100 which extends laterally between the forked ends 102 of a support post 104. The support post 104 is mounted on a bridge plate 106 which is mounted on the free ends of the stub shafts 72 by means of grub screws 108. A clamping screw 110 serves to lock the post 104 in a fixed position with respect to the bridge plate 106. This form of mounting provides freedom to adjust the angle of inclination, rotational position and height of the chute with respect to the hopper.

For the purposes of driving the conveyor belt 28, the shaft 36 is formed with a square shaped socket 112. A square shaped drive shaft 114 is provided as the output shaft of a reduction gear box 116 which is powered by a motor 118. The output shaft 114 is seated in the socket 112 and the reduction gear box is clamped to the support plate 24 by suitable mounting screws.

The dispenser 30 which is illustrated in FIG. 1 is a conventional dispenser which has a zigzag shaped storage slot 120, the open upper end of which is arranged to be disposed directly in line with the discharge end of the conveyor 28.

In use, the operator grasps a handful of electronic components 20 and drops a stream of components into the chute from above the open upper end of the chute. The components will then fall to the bottom of the V-shaped slipway and will be located in the bottom of the slipway before being discharged into the hopper. The components will automatically become axially aligned with the slipway. The angle of inclination of the chute is adjusted to ensure that the components will shoot into the hopper at a sufficient velocity to cause the leading end of the leading lead to strike or at least closely approach the opposite side wall of the hopper at the point where the body portion of the component is closely adjacent the underlying surface of the back wall so that the components will assume the position shown in broken lines in FIG. 1 when entering the hopper. The components will then slide down the back wall to come to rest at the lower edge of the back wall on the bottom wall as shown in FIG. 2 of the drawings. The conveyor belt 28 is continuously driven with the result that successive components are seated in the notches 60 and conveyed upwardly out of the hopper to be discharged into the slot 120 of the dispenser 30.

Thus it will be seen that the operator is not required to carefully position each component in a notch of a conveyor belt or in the slot 120 of the dispenser. The operator is merely required to drop components into the chute 92. It has been found that it is not necessary to have the operator drop the components one at a time into the chute. If a stream of components is dropped into the chute they will automatically become properly positioned in the bottom of the hopper. Furthermore, even if there is occasionally some minor misalignment in the bottom of the hopper, it is a simple matter for the operator to reach into the hopper to correctly position the components in the bottom of the hopper.

Figure 4:
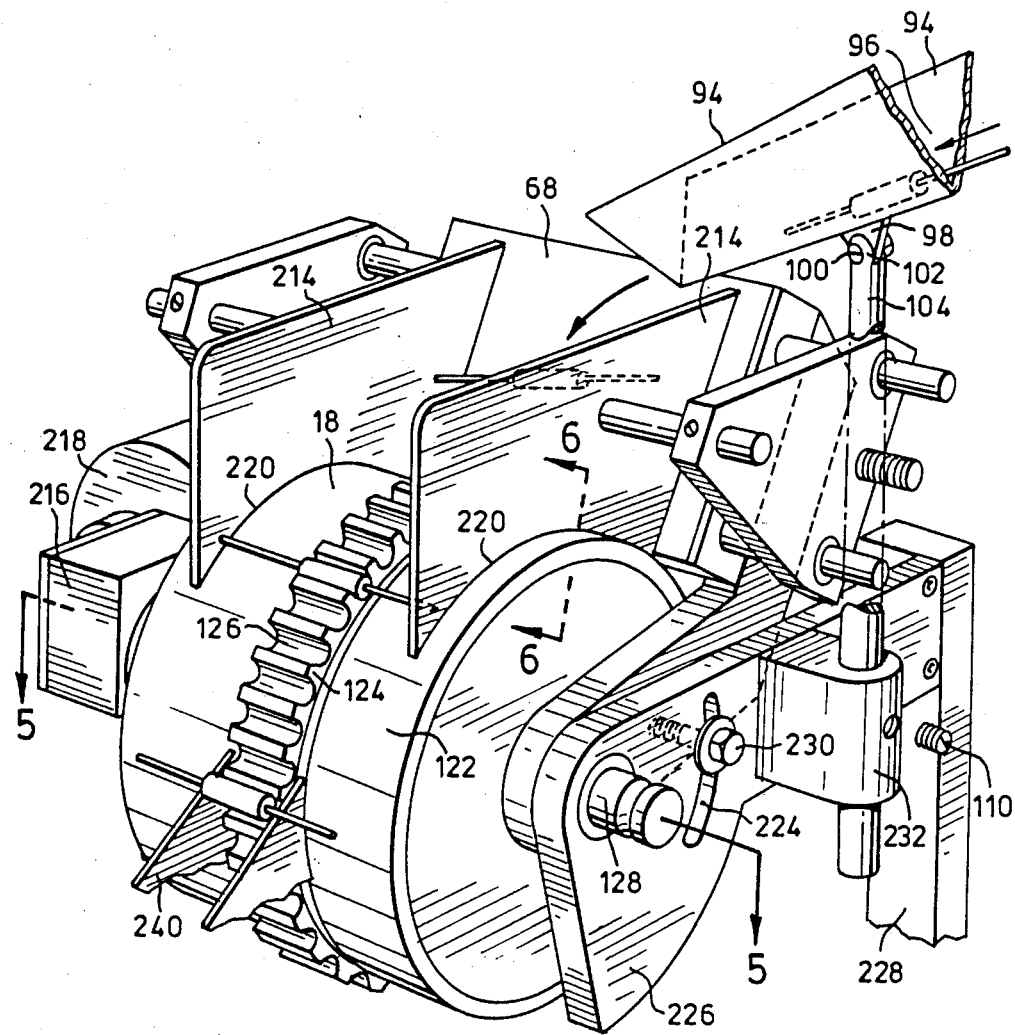
FIG. 4 is a pictorial side view of a bulk feeder constructed in accordance with a further embodiment of the present invention.
Figure 5:
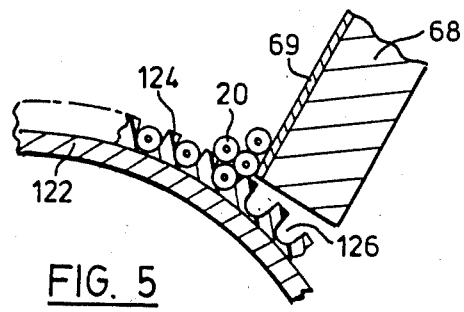
FIG. 5 is a sectional view of the feeding drum of FIG. 4 taken along the line 5—5.

Various modifications of the present invention will be apparent to those skilled in the art. One such modification is illustrated in FIGS. 4 and 5 of the drawings. In this embodiment, the bottom wall 18 of the hopper is formed from a segment of the circumference of a drum 122 which has a raised ridge 124 extending about its circumference within which slots 126 are formed. The drum 122 is mounted on a shaft 128 which is rotatably driven by a motor 218 through a gear box 216. The side walls 214 each have an arcuate shaped lower edge 220 which follows the curvature of the surface of the drum 122.

The back plate 68 is mounted on a pair of arms 222 which are pivotally mounted on the shaft 128. An arcuate shaped slot 224 is formed on a support arm 226 which is supported by an upright post 228 which forms an element of the frame of the lead forming machine. A set screw 230 passes through the slot 224 and is threadedly mounted in the arm 222 and can be released to permit adjustment of the angle of inclination of the back plate 68 relative to the vertical plane.

In this embodiment, the support post 104 of the chute 96 is mounted in a lug 232 which is mounted on the support arm 226.

As shown in FIG. 5 of the drawings, electronic components 20 may be accumulated in the bottom of the hopper and transported one at a time out of the bottom of the hopper by the conveyor 124 to a suitable receiver 240.

Figure 6:
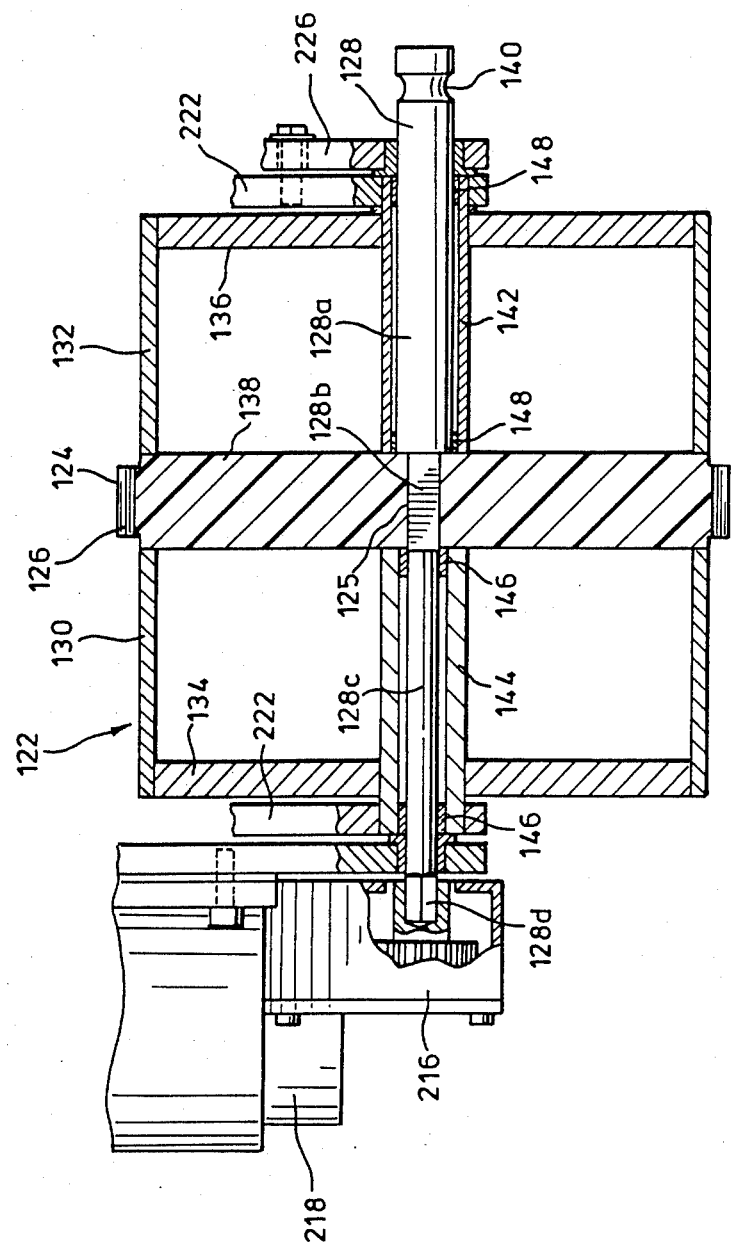
FIG. 6 is a sectional view through the wall of the drum taken along the line 6—6 of FIG. 4.

As shown in FIG. 6 of the drawings, the drum 122 comprises a pair of hollow cylindrical members 130 and 132 which are mounted on discs 134 and 136 respectively. The raised ridge 124 is formed at the outer perimeter of a replaceable disc 138. Discs 138 having raised ridge portions 124 of different widths may be mounted between the cylindrical members 130 and 132.

The shaft 128 is designed to be pulled axially out of the drum 122. For this purpose, a groove 140 is formed adjacent the outer end of the shaft 128. The shaft 128 has a first portion 128a of circular cross-section, a second portion 128b of square cross-section, a third portion 128c of circular cross-section and a forth portion 128d of square cross-section. The circular portion 128c is of a diameter equal to the minimum thickness of the square section 128b such that it can be withdrawn through the square shaped passage 125 which is formed in the disc 138. When the shaft 128 is withdrawn, the disc 138 can be removed from between the cylindrical members 130 and 132 and replaced by a disc 138 in which the proportions of the notches 126 and the raised ridge portion 124 are set to accommodate a component of a different size. Tubular sleeves 142 and 144 are mounted in the arms 222 and extend through the discs 134 and 136 respectively to but against the opposite faces of the disc 138. Bushes 146 and 148 are located in the sleeves 144 and 142 respectively and serve to support the shaft 128 for rotation therein so that the disc 138 may be rotatably driven with respect to the cylindrical members 130 and 132.

These and other modifications of the structure of the present invention will be apparent to those skilled in the art.

From the foregoing it will be apparent that the present invention provides a simple and efficient mechanism for use in feeding loose electronic components one at a time to a dispenser for dispensing components into a lead forming machine or the like.

I claim:

1. A bulk feeder for feeding electronic components one at a time into a receiver for a lead forming machine, each component having a body portion and axially aligned lead wires extending one from each end of the body portion, said feeder comprising:
   (a) a hopper comprising:
      i. a pair of oppositely disposed side walls which are spaced from one another a distance which is slightly greater than the length of the electronic components which are to be fed to the forming machine,
      ii. a back wall extendimg between the side walls and being downwardly and forwardly inclined, said back wall having a lower end,
      iii. a bottom wall extending between the side walls, at least a portion of said bottom wall extending forwardly and upwardly from the lower end of the back wall,
   (b) a chute having a slipway channel which is shaped to axially aling electronic components with the direction in which they slide down the chute, said chute having a discharge end which is laterally aligned with respect to said side walls so that the axially aligned components are discharged laterally of the hopper from a point adjacent a first of said side walls toward the other of said side walls, said discharge end also being aligned with respect to said other of said side walls and said back wall so as to direct the components discharged therefrom to strike the other side wall at a point of contact adjacent the back wall such that the component will thereafter slide down the back wall to assume a position extending transversely of the hopper at the lower end of the back wall,
   (c) a conveyor projecting above and mounted for movement from said lower end of said back wall to the receiver for said components, said conveyor having an upper face which is movable below said lower end of said back wall, a plurality of notches formed in said upper face, said notches being arranged and proportioned to receive and seat by gravity the transversly extending body portion of a single component located at the lower end of the back wall to transport the components one at a time out of said hopper, successive notches being arranged directly adjacent to one another whereby a large number of components can be removed from the hopper without requiring the conveyor to operate at high speed.

2. A bulk feed as claimed in claim 1, including adjustable mounting means for supporting said chute so as to permit adjustment of the position in which it is set with respect to the hopper to adjust the angle of inclination of the slipway channel and the direction of discharge of the slipway channel relative to the hopper.

3. A bulk feeder as claimed in claim 1, including means for adjustable mounting said back wall and said side walls of said hopper relative to said conveyor so as to permit adjustment of the angle of inclination of said side and back walls relative to a horizontal plane so as to adjust the angle at which the incoming components will slide down the back wall so as to maintain the transverse orientation of the components sliding down said back wall while continuously maintaining the spacing between said back wall and said conveyor.

4. A bulk feeder as claimed in claim 1, wherein the conveyor is in the form of an endless belt having a portion of its forward run extending adjacent the receiver for the lead forming machine, and adjustable mounting means for varying the angle of inclination of the conveyor and hopper relative to the receiver.

5. A bulk feeder as claimed in claim 3, wherein said bottom wall of said hopper is in the form of an arcuate portion of the perimeter of a drum which is mounted for rotation so as to form a moving bottom wall which moves upwardly and outwardly from beneath the lower end of said back wall, said drum having a plurality of transversely extending notches formed in a raised band which extends about the perimeter of the drum, each notch being proportional to accommodate and located to receive a body of a component therein for movement therewith out of said hopper.

6. A bulk feeder as claimed in claim 1 including mounting means for supporting said side walls relative to one another and proximate to said back wall, said back wall extending outwardly of said side walls, and said mounting means being selectively adjustable so as to move said side walls toward and away from one another so as to adjust the width of the hopper to accommodate components of different lengths.

7. A bulk feeder as claimed in claim 1, wherein said bottom wall of the hopper is in the form of an arcuate portion of the perimeter of a drum, said drum comprising:

a pair of cylindrical-shaped members, said conveyor comprising a circular-shaped disc axially aligned with and located between said cylindrical members, said notches being formed in the perimeter of said disc.

8. A bulk feeder for feeding electronic components one at a time into a lead forming machine, each component having a body portion and axially aligned lead wire extending one from each end of the body portion, said feeder comprising:

(a) a hopper including:

i. a pair of oppositely disposed side walls which are spaced from one another a distance which is slightly greater than the length of the electronic components which are to be fed to the forming machine, each of said side walls having upper and lower edges, ii. a back wall extending between the side walls and being downwardly and forwardly inclined, said back wall having a lower end, iii. a cylindrical drum mounted adjacent said lower edges of said side walls and below said lower end of said back wall so as to extend between the side walls, at least a portion of the periphery of said drum forming a bottom wall for said hopper, a circular disc carried by said drum and extending outwardly of said periphery thereof, said disc having a plurality of notches formed therein, said notches being arranged and proportional to receive and seat by gravity the transversely extending body portions of the components located adjacent the lower end of said back wall of the hopper, iv. means for rotatably driving said disc to convey the components which are seated on the disc from the hopper.

* * * * *